April 8, 1947. H. C. HALLERSTROM 2,418,634
SPEED CONTROL VALVE
Filed Nov. 8, 1943 2 Sheets-Sheet 1
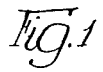
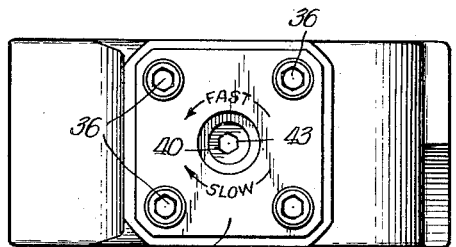
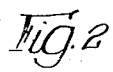
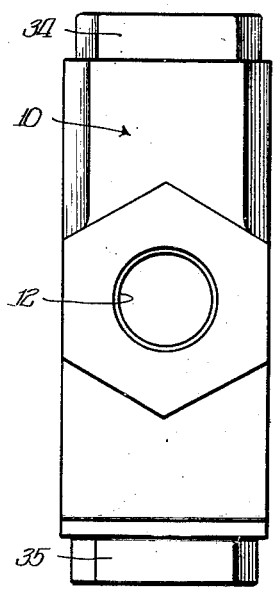
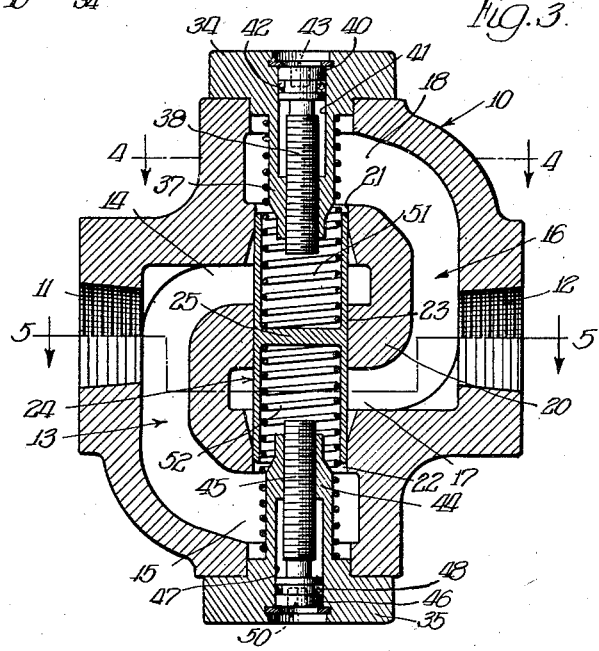
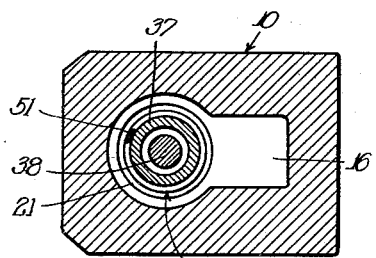
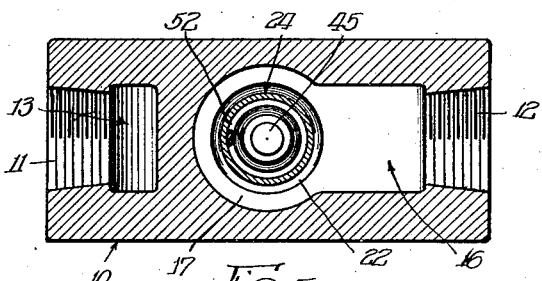
INVENTOR.
Harold C. Hallerstrom,
BY April 8, 1947.  H. C. HALLERSTROM  2,418,634
SPEED CONTROL VALVE
Filed Nov. 8, 1943  2 Sheets-Sheet 2
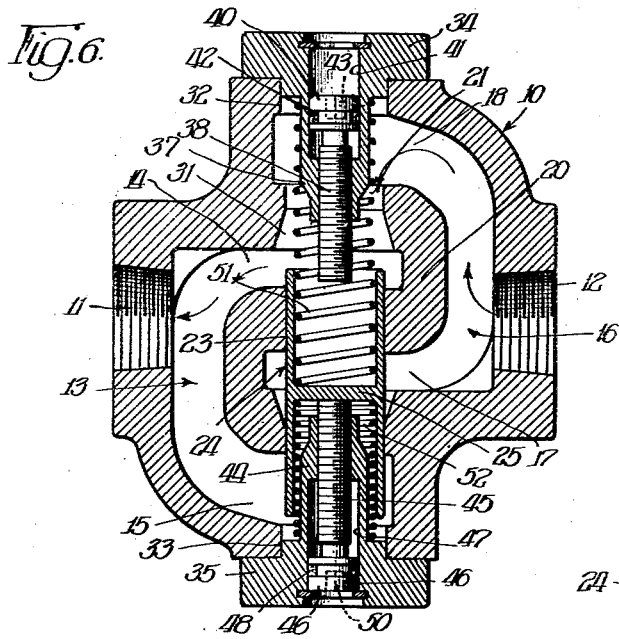
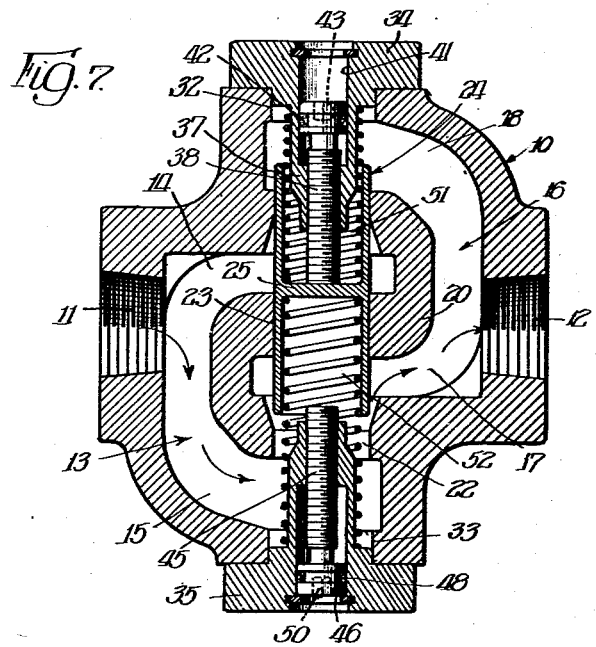
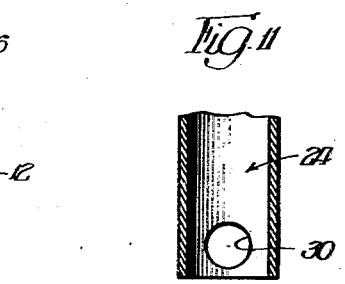
INVENTOR.
Harold C. Hallerstrom,
BY Patented Apr. 8, 1947

2,418,634

UNITED STATES PATENT OFFICE 2,418,634

SPEED CONTROL VALVE

Harold C. Hallerstrom, Evanston, Ill., assignor to Hanna Engineering Works, Chicago, Ill., a corporation of Illinois Application November 8, 1943, Serial No. 509,349

4 Claims. (Cl. 251—118)

The invention relates to valves and has reference more particularly to a two-way speed control valve of improved construction and operation.

It is often necessary to control the rate of flow of a gas or liquid through a conduit, as, for example, to and from an operating cylinder such as is used on a hoist or similar machine. This is best done by means of a control valve in connection with another valve, the first valve controlling the rate of flow and thus the speed in each direction, and the other valve turning on and off the flow of the fluid and determining its direction of flow.

An object of the invention is to provide a speed control valve which will fulfill the exacting demands of present day service.

Another object of the invention is to provide a speed control valve which will be simple in design, easy to install, easy to adjust and clean, and which will give long and satisfactory service.

Another object is to provide a valve as described which will be capable of the fine adjustments necessary in the timed operations of numerous liquid and gas operated machines, and which adjustments from minimum flow to maximum capacity in one direction is entirely independent of the existing adjustment in the opposite direction.

Another object is to provide a two-way speed control valve having a movable valve element which will be guided at all times in its reciprocating movements by at least two spaced guiding surfaces, and which valve element will have a no-flow position determined by two balanced oppositely acting springs to eliminate shock when the flow is terminated.

A further object is to provide a control valve wherein the parts are arranged so that the direction of flow will be axial of the reciprocating valve element and wherein the pressures within the housing will be balanced to relieve eddy currents against the low pressure end of the said valve element.

With these and various objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a top view in plan of the two-way speed control valve of the invention;

Figure 2 is an end elevational view;

Figure 3 is a sectional view taken substantially vertically through the valve showing the improved construction of the invention;

Figure 4 is a horizontal sectional view taken along line 4—4 of Figure 3 and looking in the direction of the arrows;

Figure 5 is a horizontal sectional view taken substantially along line 5—5 of Figure 3 and looking in the direction of the arrows;

Figure 6 is a vertical sectional view similar to Figure 3 but showing the reciprocating valve element in one position of operation;

Figure 7 is a vertical sectional view but showing the reciprocating valve element in another position of operation with the same setting for the adjustable stops as in Figure 6;

Figure 8 is a fragmentary sectional view showing one manner of notching the operating ends of the reciprocating valve element;

Figures 9 and 10 are fragmentary elevational views showing different preferred shapes for the operating end of the reciprocating valve element; and Figure 11 is a fragmentary sectional view showing the operating end of the reciprocating valve element provided with an opening.

Referring to the drawings, the housing or casing 10 of the valve is provided with openings 11 and 12 for pipe connections. Opening 11 in the left end of the valve, Figures 3, 6 and 7, leads to an interior chamber 13 of semi-circular shape having an inlet end 14 in the upper extremity thereof and an outlet end 15 in the lower extremity thereof. The opening 12 leads to a chamber 16 also of semi-circular shape and which includes an inlet end 17 in the lower extremity thereof and an outlet 18 in the upper extremity. The arrangement of the chambers 13 and 16 provides an internal partition 20 of serpentine shape and which internal partition is formed with three co-axial openings of the same size. Opening 21, as best shown in Figure 6, extends from the outlet of chamber 16 to the inlet of chamber 13. Opening 22 in a similar manner extends from the outlet of chamber 13 to the inlet of chamber 16, as best shown in Figure 7. The serpentine partition 20 is formed with a third centrally located opening 23 which receives the reciprocating valve element 24, said valve element having a sliding fit in opening 23 and thus being guided by said opening in its reciprocating movements.

The reciprocating valve element 24 is cylindrical in shape and the length of said element is such that when centrally positioned, as shown in Figure 3, one end of the element extends into opening 21 and its opposite end into opening 22. It will therefore be understood that when the valve element is centrally positioned said openings 21 and 22 are closed thereby. Said element has a recess in each end which extends to the middle partition 25. The walls of the valve element on each side of the partition are of relatively thin metal and the exterior surfaces of the same have a sliding fit with the central opening 23 and with openings 21 and 22. The respective ends of the valve element may be notched, curved or pointed, as illustrated in Figures 8, 9 and 10. Figure 8 illustrates one manner of providing the respective ends of the element with a V-shaped notch 26. According to Figures 9 and 10 the respective ends may be pointed as at 27 which forms semi-circular openings 28 at the sides. According to Figure 11 the respective ends of the valve element may be provided with an opening 30.

The valve housing 10 is provided with a top opening 32 and with a similar bottom opening 33. Both top and bottom openings are closed by the closure members 34 and 35, respectively, each member being suitably secured to the valve housing by screws 36, as best shown in Figure 1. The top member 34 is integral with an inwardly extending portion 37 which is threaded to receive the screw 38 providing an adjustable stop to limit reciprocating movement of the valve element 24 when the same moves upwardly toward the top closure member 24. The screw 38 includes the head portion 40 having location within the well 41. Packing 42 is carried by said head portion 40 and the same is provided with a hexagonal socket 43 for receiving a tool whereby screw 38 can be rotated to vary its position longitudinally with respect to the inwardly extending portion 37. The bottom member 35 is similarly formed with an integral portion 44 which receives the threaded screw 45. The head portion 46 of said screw is received within the well 47 and said head portion carries packing 48. The hexagonal socket 50 in the head portion likewise receives a tool by means of which the adjustment of screw 45 can be varied.

The top and bottom members 34 and 35 and inwardly directed portions 37 and 44 serve a triple purpose in that they render accessible the interior of the valve housing 10, provide bearing surfaces for the ends of the coil springs 51 and 52, and with the adjusting screws 38 and 45 form adjustable stops for limiting the movement of the valve element 24 to thus serve to fix the size of each of the two independent openings 21 and 22. The coil spring 51 seats against closure member 34 at one end and extends within the valve element to seat against the middle partition 25 at its opposite end. The coil spring 52 seats against closure member 35 and is likewise received by the valve element to seat against the opposite side of the middle partition.

When there is no flow of fluid through the valve in either direction the valve element is held in its middle or neutral position as shown in Figure 3, by means of the springs 51 and 52, which are adjusted to apply substantially uniform pressure to said reciprocating valve element. The chambers in the valve housing are so shaped around the valve element that lateral fluid pressures against the same are balanced, thus making the movements of the valve element virtually frictionless, and insuring negligible wear and leakage. This feature in the construction of the present valve will be clearly evident from Figures 4 and 5. The inlet and outlet end of each chamber extends completely around the valve element.

Figure 6 shows the reciprocating valve element in one position of operation wherein fluid is flowing from chamber 16 into chamber 13. The direction of flow is clearly indicated by the arrows. When the fluid enters chamber 16 the pressure of the same on the valve element 24, together with the pressure of the coil spring 51, is such as to over-balance coil spring 52 and thus the valve element is caused to move in a downward direction, permitting the liquid to flow through opening 21, which flow will continue as long as the valve element remains in this over-balanced position where the middle partition 25 is maintained in contact with adjusting screw 45. The position of adjusting screw 45 therefore determines the extent of movement of the valve element in a downward direction and accordingly determines the size of opening 21. Therefore screw 45 will regulate flow from chamber 16 to chamber 13 and a feature of the invention resides in the fact that the adjustment of said screw for regulating the flow of the fluid in this direction is entirely independent of adjustment of screw 38 for regulating flow of fluid in an opposite direction.

Referring to Figure 7, it will be seen that the fluid is flowing from chamber 13 to chamber 16 but that the flow is at a substantially restricted rate compared to that taking place in Figure 6. The reason for this restricted flow is due to adjustment of screw 38 which has been positioned so as to limit movement of the valve element in an upward direction. The action of the fluid pressure in chamber 13 in conjunction with spring 52 is such as to over-balance the pressure of spring 51 but the valve element can move upwardly to an extent only permitted by screw 38.

The openings 21 and 22 are shown in Figures 6 and 7 as cylindrical for a part of their length and as having a tapering inwardly directed end 31 for the remainder of their length. This makes possible very fine adjustments for the openings in the valve. Other refinements in adjustment can be obtained by leaving the openings 21 and 22 cylindrical for their entire length and giving various shapes to the respective ends of the valve element as above described in connection with Figures 8 to 11 inclusive.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. A speed control valve including a housing having an opening in each end thereof, an internal partition in the housing forming a chamber on each side communicating with the end openings respectively, said partition having a plurality of aligned openings therein, a movable valve element having a sliding fit in one of said aligned openings and being supported thereby for reciprocating movement, each end of the valve element being adapted to extend into one of the other of the aligned openings to close the same, resilient means yieldingly maintaining said valve element in neutral position with said other openings closed, and a stop member at each end of the valve element for limiting axial movement of the valve element in either direction.

2. A speed control valve including a housing having an opening in each end thereof, a partition in said housing forming a chamber on each side communicating with the end openings respectively, said partition having a valve opening in each extremity thereof and having a central opening aligned with the said valve openings, a movable valve element having a sliding fit in said central opening and supported thereby for reciprocating movement, said valve element having a length to extend from one valve opening to the other whereby said valve openings are maintained closed when the valve element is in neutral position, a resilient coil spring located between each end of the valve element and the housing and adapted to apply equal pressures to said valve element, and an adjustable stop member having location within each coil spring and directed toward the valve element for limiting axial movement of the same in either direction.

3. In a two-way speed control valve including a housing having an opening in each end thereof for connection with a fluid supply conduit, an internal partition in said housing forming a chamber on each side communicating with the end openings respectively, said partition having a serpentine shape and having three openings therein in aligned relation, one of said openings being located centrally of the partition and the other two forming valve openings and being located at the respective extremities of the partition, a movable valve element having a sliding fit in the central opening and being supported thereby, said valve element when in neutral position having a length to extend into each valve opening to close the same, opposed coil springs for said valve element adjusted to apply equal pressures on opposite sides thereof for yieldingly maintaining the valve element in neutral position, and an adjustable stop member in associated relation with each coil spring for limiting axial movement of the valve element in either direction.

4. A two-way speed control valve as defined by claim 3, wherein the opposed coil springs are confined between the valve element and the housing, and wherein said adjustable stop members are independently adjustable from the exterior of the housing.

HAROLD C. HALLERSTROM.

REFERENCES CITED

The following references are of record in the file of this patent:

UNITED STATES PATENTS

| Number | Name | Date |
| --- | --- | --- |
| 2,121,936 | Thomas | June 28, 1938 |
| 1,588,657 | Christensen | June 15, 1926 |
| 1,955,180 | Furgason | Apr. 17, 1934 |
| 2,228,082 | Krome | Oct. 3, 1938 |
| 2,358,611 | Ziebolz | Sept. 19, 1944 |
| 1,271,521 | Tate | July 2, 1918 |
| 2,300,263 | McLeod | Oct. 27, 1942 |
| 245,662 | Rinderknecht | Aug. 16, 1881 |

FOREIGN PATENTS

| Number | Country | Date |
| --- | --- | --- |
| 441,223 | French | May 21, 1912 |
| 361,441 | British | Nov. 26, 1931 |